INVENTOR.
Joseph W. Mihalyi
BY
W. E. Thibodeau & A. W. Dew
ATTORNEYS.

United States Patent Office 2,823,457
Patented Feb. 18, 1958

2,823,457

RETICLE ADJUSTMENT MECHANISM

Joseph W. Mihalyi, Rochester, N. Y., assignor, by mesne assignments, to the United States of America as represented by the Secretary of the Army Application August 10, 1956, Serial No. 603,461

2 Claims. (Cl. 33—50)

This invention relates to a mechanism for quick replacement of one reticle with another in a telescopic system. Telescopes of the type used in artillery range finding require reticles having different patterns of scales thereon. Changing reticles in telescopes of this type heretofore has been an operation requiring the disassembly of a portion of the telescope, generally in the region of the eyepiece. This operation was slow, required the use of tools, and resulted in frequent loss of parts under field service. With the present invention, this has been eliminated by providing a simple means for moving one reticle into focus in a telescope system and simultaneously moving another out of focus.

It is a principal object of the invention to provide a means for quickly moving a reticle out of focus in a telescope and at the same time to bring another reticle into focus by a simple turn of a knob.

It is another object of the invention to provide a greatly simplified means for quickly replacing one reticle with another without the usual cumbersome and expensive arrangements presently employed.

Figure 1:
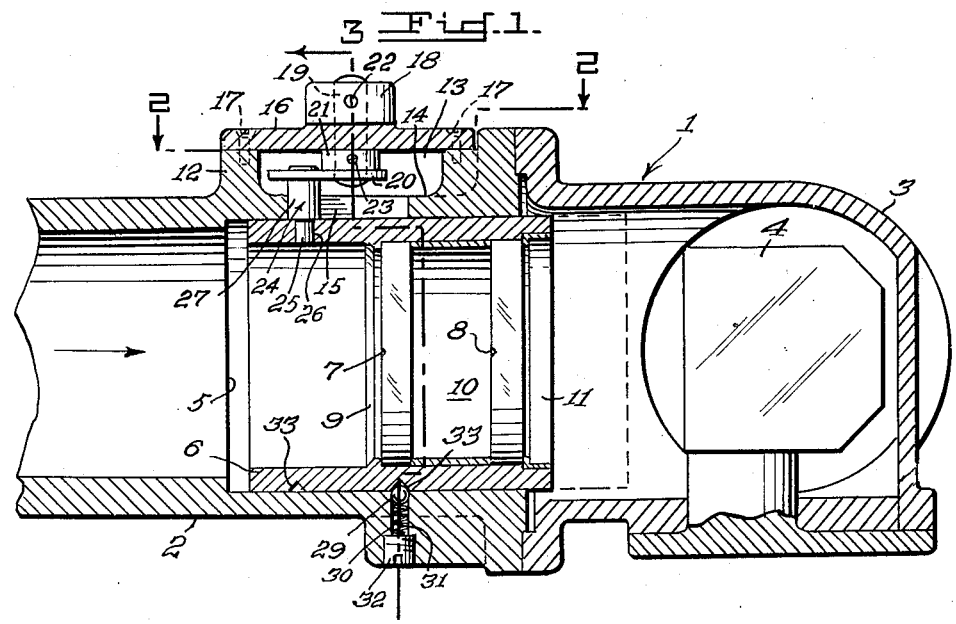
Figures 2, 3:
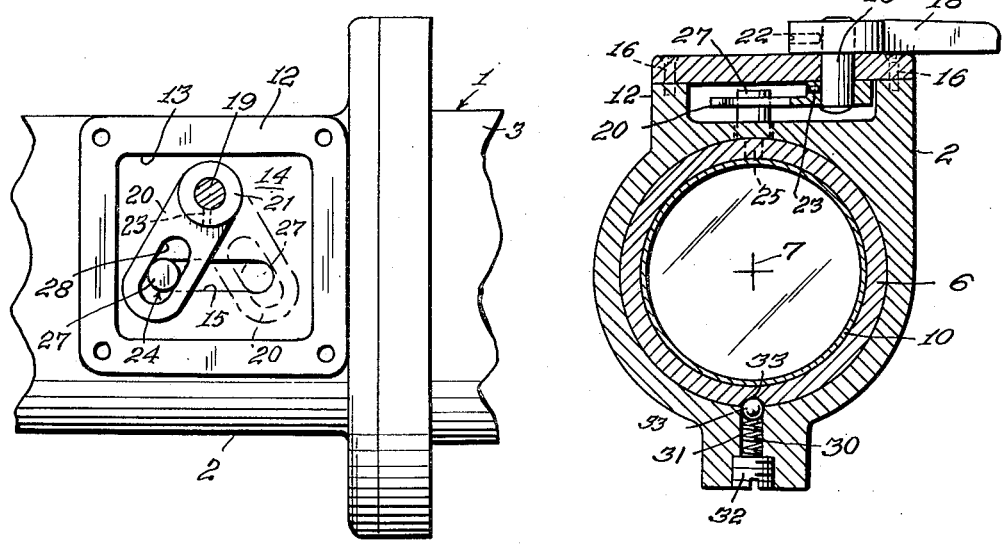

The specific nature of the invention as well as other objects and advantages thereof, will clearly appear from a description of a preferred embodiment as shown in the accompanying drawing in which:

Fig. 1 is a longitudinal section taken through a portion of a telescope and illustrating the reticle changing mechanism of the invention, Fig. 2 is a sectional view taken along line 2—2 of Fig. 1 and looking in the direction of the arrows, and Fig. 3 is a sectional view taken along line 3—3 of Fig. 1 and looking in the direction of the arrows.

Referring more particularly to the drawing, wherein like reference characters designate like or corresponding parts throughout the different views, reference character 1 indicates generally a portion of a telescope between the eyepiece and the first elbow. 2 is a tubular shank portion to which the eyepiece (not shown) is mounted. A first elbow 3 has a prism 4 mounted therein to refract the rays 90° to another shank portion (not shown) of the telescope.

Approximately intermediate of the eyepiece (not shown) and the first elbow 3 is usually mounted a reticle in shank 2. With the present invention, there is provided a milled-out chamber 5 in the portion of shank 2 adjacent the elbow 3. In this milled-out chamber, there is slidably mounted a tubular member 6. As shown in Fig. 1, there are two reticles 7 and 8 mounted in spaced relation in member 6. Reticle 7 is held against axial movement by an annular bead 9 and is spaced from reticle 8 by spacing element 10. This assembly is secured in tubular member 6 by a retaining element 11. A retangular boss 12 is provided along the peripheral surface of the shank 2 and is milled out to provide a chamber 13 having a flat floor 14 provided with a longitudinal slot 15 cut therein for a purpose to be later described. A cover 16 is provided and is fastened to the boss 12 by screws 17. Mechanism for sliding the reticle receiving tubular member 6 in chamber 5 is journaled in the cover 16 and consists of a knob 18 fixed to a shaft 19 journaled in cover 16 and extending into chamber 13 and is connected to a link 20. A boss 21 on link 20 is drilled to receive shaft 19, and set screws 22 and 23 secure the knob 18 and link 20 to shaft 19 respectively, against rotation therein. A pin, generally indicated by 24 is provided with a reduced lower portion 25 received in a bore 26 in the member 6 and an enlarged portion 27 is received in an elongated slot 28 in link 20 and is adapted to ride therein upon movement of link 20. Means to prevent axial displacement of the inner tubular member after it has been moved to the selected position are provided and includes a detent ball 29 biased by a coil spring towards the tubular member 6 in a bore 31 cut in the tubular shank 2 at a right angle to the longitudinal axis of the shank. The detent assembly is retained in bore 31 by a threaded screw plug 32 spaced notches 33 are provided on the outer peripheral surface of the inner tubular member 6 to receive the detent ball 29.

The operation of the mechanism is as follows:

Assuming that reticle 8 is in focus and it is desired to move reticle 7 into focus instead. By merely twisting knob 18 to move pin 24 from its position shown in Fig. 2 to the dotted position, reticle 7 will be moved by the tubular member 6 to assume the position formerly occupied by reticle 8 which will then be in focus, and reticle 8 will be out of focus. To reverse the positions, a twist in the other direction of the knob 18 is all that is required. The inner tubular member will be restrained against axial dislocation and putting the positioned reticle out of focus by virtue of the detent mechanism which will snap into the notches 33 as soon as the member 6 has been positioned for selection of a reticle.

It is apparent from the foregoing, that an inexpensive, simple, yet highly efficient means for replacing one reticle with another one has been provided. It can be installed in most telescope systems without greatly altering the structure thereof.

While a preferred form of the invention has been shown and described, various modifications and substitutions of equivalents will occur to those skilled in the art after a study of the foregoing disclosure. Hence, the disclosures should be taken in an illustrative rather than a limiting sense, and it is the desire and intention to reserve all modifications within the scope of the subjoined claims.

Having now fully disclosed the invention, what is claimed is:

1. In a mechanism for quick replacement of one reticle with another in a telescopic system, an outer tubular member, having a coaxial chamber bored therein, an open-ended, inner tubular member mounted to reciprocate within said coaxial chamber in said outer tubular member, a pair of reticles secured in spaced relation within said inner tubular member, means for sliding said inner tubular member in a reciprocating manner in said chamber comprising, an upstanding boss on said outer tubular member having a milled-out chamber therein and a slot in its floor communicating with the interior of said chamber, said slot being disposed in parallel relation to the longitudinal axes of said outer and inner tubular members, a cover secured to said boss on said outer tubular member, a first pin defining a reduced portion and an enlarged portion, said reduced portion secured to said inner tubular member, said enlarged portion extending up through said slot in said floor of said chamber, a second pin journaled for rotation in said cover, a flat link provided with an elongated slot at one of its ends embracing said enlarged portion of said first pin, a boss integral to the other end of said link having a vertical bore therein, the lower portion of said second pin extending into said bore in said boss on said link, an operating knob adapted to be fitted over the upper portion of said second pin and means for securing said link and said knob against rotation about said second pin.

2. In a mechanism for quick replacement of one reticle with another in a telescopic system including, an outer tubular member having an enclosed chamber formed in its wall and a slot piercing the floor thereof, an inner tubular member slidably mounted within said outer tubular member, a pair of coaxially spaced reticles secured in said inner tubular member, means for reciprocating said inner tubular member within said outer tubular member comprising, a first member fixed with said inner tubular member and projecting through said slot and into said chamber, a second member rotatably mounted in the roof of said chamber and a third member fixed to said second member and slidably connected to said first member, whereby upon rotation of said second member said inner tubular member will slide axially in said outer tubular member.

References Cited in the file of this patent
UNITED STATES PATENTS

| | | |
|---|---|---|
| 153,494 | Nystrom et al. | July 28, 1874 |
| 416,270 | Paoli | Dec. 3, 1889 |
| 886,647 | Schleth | May 5, 1908 |
| 1,206,060 | Warner | Nov. 28, 1916 |
| 2,138,067 | Mossberg | Nov. 29, 1938 |